United States Patent [19]

Alvarez Casariego et al.

[11] Patent Number: 5,545,596

[45] Date of Patent: Aug. 13, 1996

[54] COMPOSITION FOR COLORED GLASS INTENDED FOR THE MANUFACTURE OF GLAZING PANES

[75] Inventors: Pedro Alvarez Casariego, Salinas, Spain; Jean-Jacques Massol, Asnieres, France

[73] Assignee: Saint-Gobain Vitrage International, Courbevoie, France

[21] Appl. No.: 487,393

[22] Filed: Jun. 7, 1995

Related U.S. Application Data

[62] Division of Ser. No. 969,836, filed as PCT/FR92/00913, Oct. 2, 1992, abandoned.

[30] Foreign Application Priority Data

Oct. 3, 1991 [FR] France .................. 91 12164

[51] Int. Cl.⁶ .................................. C03C 3/087
[52] U.S. Cl. ........................ 501/71; 501/70
[58] Field of Search .................. 501/69, 70, 71

[56] References Cited

U.S. PATENT DOCUMENTS

| | | | |
|---|---|---|---|
| 2,974,052 | 3/1961 | Bacon et al. | 501/71 |
| 3,296,004 | 1/1967 | Duncan | 501/71 |
| 4,104,076 | 8/1978 | Pons | 501/71 |
| 4,190,452 | 2/1980 | Fischer et al. | 501/71 |
| 4,339,541 | 7/1982 | Dela Ruye | 501/71 |
| 4,792,536 | 12/1988 | Pecoraro et al. | 501/70 |
| 4,866,010 | 9/1989 | Boulos et al. | 501/71 |
| 5,023,210 | 6/1991 | Krumwiede et al. | 501/71 |
| 5,030,593 | 7/1991 | Heithoff | 501/72 |
| 5,077,133 | 12/1991 | Cheng | 501/64 |
| 5,214,008 | 5/1993 | Beckwith et al. | 501/69 |
| 5,240,886 | 8/1993 | Gulotta et al. | 501/70 |
| 5,264,400 | 11/1993 | Nakuguchi et al. | 501/71 |
| 5,278,108 | 1/1994 | Cheng et al. | 501/71 |
| 5,344,798 | 9/1994 | Morimoto et al. | 501/70 |
| 5,352,640 | 10/1994 | Combes et al. | 501/71 |
| 5,372,977 | 12/1994 | Mazon-Ramos et al. | 501/57 |
| 5,393,593 | 2/1995 | Gulotta et al. | 428/220 |
| 5,411,922 | 5/1995 | Jones | 501/71 |

FOREIGN PATENT DOCUMENTS

| | | |
|---|---|---|
| 0482535 | 4/1992 | European Pat. Off. |
| 2074983 | 10/1971 | France . |
| 57-106537 | 7/1982 | Japan . |
| 1168769 | 10/1969 | United Kingdom . |
| 1331492 | 9/1973 | United Kingdom . |
| 2162835 | 2/1986 | United Kingdom . |

*Primary Examiner*—Mark L. Bell
*Assistant Examiner*—David Sample
*Attorney, Agent, or Firm*—Oblon, Spivak, McClelland, Maier, & Neustadt, P.C.

[57] ABSTRACT

The invention concerns compositions of colored glasses intended for the manufacture of glazing panes suitable for mounting in an automobile vehicle. The panes are of silico-sodo-calcic glasses having a total energy transmission factor ($T_E$) less than the light transmission factor under illuminant A ($TL_A$), the factor $T_E$ being from 10 to 48% and the factor $TL_A$ from 20 to 60 % for a thickness of 3.85 mm; these glasses comprise (in % by weight), as coloring agents, from 0.45 to 2.5% of $Fe_2O_3$ (total iron), from 0.001 to 0.02% of CoO, from 0 to 0.0025% of Se and from 0 to 0.1% of $Cr_2O_3$.

3 Claims, No Drawings

COMPOSITION FOR COLORED GLASS INTENDED FOR THE MANUFACTURE OF GLAZING PANES

This is a Division of application Ser. No. 07/969,836, filed on Aug. 5, 1993, now abandoned, which was filed as International Application No. PCT/FR92/00913, on Oct. 2, 1992.

This invention relates to a composition for coloured glass intended for the manufacture of a pane suitable, notably, for mounting in an automobile vehicle. The invention is aimed more especially at a glass composition which will enable a pane to be produced that is suitable for forming the rear lateral windows and rear windows of an automobile vehicle.

Automobile designers offer their clients colored panes, not only in a concern for aesthetic values but also for the functional role which they can fulfil, that is to say notably the improvement in visibility in critical conditions of lighting, and/or the comfort of the passengers.

From this latter aspect, since the proportion of glazed area increases every year in new models, the hothouse effect will be an increasingly important factor to be taken into account in the air conditioning of the vehicle. One of the routes by which this effect maybe reduced is by the improvement in panes of low transmission for radiation in the near infrared but in which the transmission for the visible spectrum, although less than that of conventional windscreens, is still acceptable for the passengers.

The U.S. Pat. No. 4,104,076 proposes glasses based upon oxides of iron, cobalt, chromium and/or uranium and possibly containing selenium. These glasses may be classified in two categories: the bronze glasses which have a light transmission factor of between 40 and 55%, and the grey glasses for which this factor is from 35 to 45%. These glasses, intended more especially for the production of panes for buildings, have a conventional total energy transmission factor less than 50% for a thickness of 6.2 mm.

Patent Application EP-A-0 349 909 proposes glasses having a grey tint, based upon oxides of iron and cobalt, to which at least 30 ppm selenium are added. These glasses are characterized, for a thickness of 5.56 mm, by a light transmission factor lying between 5 and 20% and a total energy transmission factor less than 40%. All the glasses given as examples have an energy transmission factor greater than the light transmission factor.

The present invention sets out to provide glasses colored in the mass which shall possess, for a specific thickness, a moderate total light transmission and a lower corresponding total energy transmission.

The invention also sets out to provide colored glasses having different compositions, which may be mounted, in the form of glazing panes, on one and the same automobile vehicle.

According to this invention, these objectives are achieved by means of coloured glasses, the composition of which comprises the following constituents in the proportions by weight defined by the following limits:

| | |
|---|---|
| $SiO_2$ | 64 to 75% |
| $Al_2O_3$ | 0 to 5% |
| $B_2O_3$ | 0 to 5% |
| CaO | 5 to 15% |
| MgO | 0 to 5% |
| $Na_2O$ | 10 to 18% |
| $K_2O$ | 0 to 5% |
| and, as colouring agents: | |
| $Fe_2O_3$ (total iron) | 0.45 to 2.5% |
| CoO | 0.001 to 0.02% |
| Se | 0 to 0.0025% |
| $Cr_2O_3$ | 0 to 0.1% | these glasses having a total energy transmission factor ($T_E$) less than the light transmission factor under illuminant A ($TL_A$), the factor $T_E$ being from 10 to 48% and the factor $TL_A$ from 20 to 60% for a thickness of 3.85 millimetres.

The compositions according to this invention may contain other constituents in very mall quantities, originating from compounds added to the vitrifiable mixture for the purpose of facilitating the refining of the glass. This is the case, for example, for $SO_3$ originating from the decomposition of sulphate added to the mixture.

The glass according to this invention may be produced in conventional furnaces and converted into a continuous band or ribbon by the well-known technique of float glass on a molten tin bath.

The glasses according to this invention have a rather low purity of excitation under illuminant C. It is generally less than 15% and most frequently less than 12%.

The transmission characteristics of glasses according to the invention and also their dominant wavelength trader illuminant C are governed by their oxidoreduction state. According to the present invention, 16 to 55% of the total iron, expressed in the form of $Fe_2O_3$, my be in the form of ferrous oxide. More generally, 20 to 40% of the total iron is in the form of ferrous oxide.

The glasses according to this invention have grey tints and more or less neutral colourations, which my vary from the blue/green to the green/yellow passing through all the intermediate hues, corresponding to dominant wavelengths under illuminant C extending from 490 to 560 nm.

The glasses according to this invention possess the desired transmission characteristics by using, as coloring agents, the oxides of iron and of cobalt, by adding possibly chromium oxide and selenium, the latter having the effect of reducing the purity of excitation.

The glasses according to this invention may comprise a part only of these colouring agents or the totality of these agents in proportions duly chosen as a function of the characteristics desired.

Thus the glasses according to this invention may comprise, as colouring agent, the oxides of iron and cobalt and, possibly also, selenium. The proportions by weight of the colouring agents in the preferred glasses of the invention belonging to this family may vary according to the properties desired.

Glasses having a grey tint and characterized by a high light transmission factor ($TL_A>40\%$) comprise the following colouring agents within the limits by weight defined:

| (I) | |
|---|---|
| $Fe_2O_3$ (total iron) | 0.45 to 1% |
| CoO | 0.001 to 0.01% |
| Se | 0.0002 to 0.002% |

Glasses also having a grey tint but characterized by a lower light transmission factor ($TL_A<40\%$) and a $T_E$ factor clearly lower than that of the glasses (I) comprise the following colouring agents in the limiting proportions by weight defined below:

| (II) | |
|---|---|
| $Fe_2O_3$ (total iron) | 1 to 1.8% |
| CoO | 0.005 to 0.02% |
| Se | 0.0005 to 0.0025% |

Among the glasses belonging to this family but which may perhaps not contain selenium, it is possible to distinguish glasses which have a high $TL_A$ factor (>40%) and a relatively low $T_E$ factor. Such glasses comprise the colouring agents defined below in the following limits by weight:

| (III) | |
|---|---|
| $Fe_2O_3$ (total iron) | 0.8 to 1.8% |
| CoO | 0.001 to 0.01% |

Still within the category of the glasses that may not contain selenium, it is also possible to define glasses which have a $TL_A$ factor and a $T_E$ factor clearly lower than those of the foregoing glasses (III). These glasses have a high content of iron oxides associated with the cobalt oxide in the following proportions by weight:

| (IV) | |
|---|---|
| $Fe_2O_3$ (total iron) | 1.3 to 2.5% |
| CoO | 0.005 to 0.015% |

Glasses (III) and (IV) can of course comprise selenium, within the general limits defined above.

Apart from the iron and cobalt oxides, and the possible selenium, the glasses according to this invention may also contain chromium oxide. The contents of colouring agents in the preferred glasses of this invention belonging to this family are defined by the following limits by weight:

| (V) | |
|---|---|
| $Fe_2O_3$ (total iron) | 0.5 to 1.5% |
| CoO | 0.003 to 0.015% |
| $Cr_2O_3$ | 0.025 to 0.09% |
| Se | 0 to 0.0025% |

For preparing the glasses of this invention, a conventional glass composition from the flat glass industry is used as the basic composition, and to this are added the colouring agents in proportions which enable the desired optical characteristics and appearance to be achieved for a given thickness. The basic glass selected has the following composition by weight:

| | |
|---|---|
| $SiO_2$ | 72.1% |
| $Al_2O_3$ | 0.74% |
| CaO | 8.90% |
| MgO | 3.79% |
| $Na_2O$ | 14.16% |
| $K_2O$ | 0.11% |
| $SO_3$ | 0.20% |

The colouring agents are added to this glass at the expense of the silica.

The attached table shows a series of examples of glass compositions illustrating this invention, notably the glass families I to V defined above. The contents of colouring agents are expressed in percentages by weight. The values for the different characteristics of these glasses were measured on panes 3.85 millimetres thick. The purity level attained by certain glasses according to this invention is remarkable having regard to the very low content of selenium in these glasses. For all the glasses according to this invention, the ratio $Fe_2O_3$ (total)/Se is greater than 200.

As indicated earlier, the glasses according to this invention may be converted into a continuous band by the technique of float glass. The glass sheets obtained by cutting this band have thicknesses varying from 2 to 8 mm. These glass sheets can be used either alone or associated with a colourless glass sheet to form glazing panes capable of being mounted on an automobile vehicle at the rear side windows and rear window.

These panes may be fitted by associating them in a glazing set with other panes which form the windscreen and the front side windows. Thus an automobile vehicle glazing set may be composed of panes, of which the total light transmission factor under illuminant A, for a given thickness, will decrease progressively from the windscreen to the rear window.

The panes obtained from glasses according to this invention may advantageously be used within such a glazing set for an automobile vehicle.

Thus the panes of the rear side windows, whether opening or fixed windows, can be produced from glasses which, for a thickness of 3.85 mm, have a total light transmission factor under illuminant A of between approximately 30 and 60%. They may be associated with rear windows made from glasses which, for the same thickness, have a total light transmission factor under illuminant A of approximately 20 to 45%.

A glazing set of this class could be produced from the glasses referenced Ex. 10 and Ex. 3 in the attached table. The panes formed of glass Ex. 10 would serve as rear side windows, the pane made of glass Ex. 3 would constitute the rear window.

TABLE

| | Ex. 1 | Ex. 2 | Ex. 3 | Ex. 4 | Ex. 5 | Ex. 6 | Ex. 7 |
|---|---|---|---|---|---|---|---|
| $Fe_2O_3$ (Total iron) | 1.15 | 1.65 | 1.95 | 0.90 | 0.96 | 0.62 | 1.27 |
| CoO | 0.0122 | 0.0110 | 0.0066 | 0.0130 | 0.0099 | 0.0055 | 0.0093 |
| Se | 0.0013 | — | — | 0.0010 | 0.0005 | 0.0009 | — |
| $Cr_2O_3$ | — | — | — | 0.0480 | 0.0350 | — | 0.0780 |
| Redox | 0.27 | 0.33 | 0.25 | 0.31 | 0.35 | 0.29 | 0.21 |
| $T_{L(A)}$ (%) | 35 | 35 | 35 | 32.5 | 37.8 | 55.7 | 40.0 |
| $T_E$ (%) | 25.3 | 18.7 | 17.8 | 24.8 | 24.7 | 44.9 | 29.8 |
| $\lambda_{D(C)}$ (nm) | 496 | 488 | 501 | 501 | 495 | 505 | 497 |
| $P_C$ (%) | 3.2 | 17.4 | 7.6 | 5.61 | 8.81 | 1.1 | 11.5 |
| | Ex. 8 | Ex. 9 | Ex. 10 | Ex. 11 | Ex. 12 | Ex. 13 | Ex. 14 |

TABLE-continued

| | | | | | | | |
|---|---|---|---|---|---|---|---|
| $Fe_2O_3$ (Total iron) | 1.10 | 0.99 | 1.50 | 0.95 | 1.2 | 1.25 | 1.84 |
| CoO | 0.0093 | 0.0103 | 0.0058 | 0.0104 | 0.0032 | 0.0102 | 0.006 |
| Se | — | 0.0003 | — | — | — | 0.0015 | — |
| $Cr_2O_3$ | 0.0880 | 0.0450 | — | 0.0600 | — | — | — |
| Redox | 0.29 | 0.25 | 0.24 | 0.35 | 0.29 | 0.28 | 0.31 |
| $T_{L(A)}$ (%) | 39.2 | 40.2 | 45.8 | 38.8 | 55.0 | 33.5 | 34.1 |
| $T_E$ (%) | 16.5 | 29.8 | 26.8 | 24.7 | 32 | 21.6 | 16.8 |
| $\lambda_{D(C)}$ (nm) | 495 | 502 | 490 | 497 | 495 | 531 | 494 |
| $P_C$ (%) | 14 | 6.49 | 10.8 | 12.21 | 6.3 | 2.8 | 11.7 |

We claim:

1. A coloured glass composition comprising the following oxides within the following limits by weight:

| | |
|---|---|
| $SiO_2$ | 64 to 75% |
| $Al_2O_3$ | 0 to 5% |
| $B_2O_3$ | 0 to 5% |
| CaO | 5 to 15% |
| MgO | 0 to 5% |
| $Na_2O$ | 10 to 18% |
| $K_2O$ | 0 to 5% | and consisting essentially of as colouring agents:

| | |
|---|---|
| $Fe_2O_3$ (total iron) | 0.5 to 1.5% |
| with FeO content representing from of the total iron content expressed in the form of $Fe_2O_3$ | 16 to 55% |
| CoO | 0.003 to 0.015% |
| $Cr_2O_3$ | 0.025 to 0.09% |
| Se | 0 to 0.0025% | wherein the glasses have a total energy transmission factor ($T_E$) less than the light transmission factor under illuminant A ($TL_A$), the factor $T_E$ being from 10 to 48% and the factor $TL_A$ from 20 to 60% for a thickness of 3.85 millimetres.

2. The composition according to claim 1, wherein the FeO content represents from 20 to 40% of the total iron expressed in the form of $Fe_2O_3$.

3. A glazing pane comprising a coloured glass sheet, wherein the coloured glass sheet has a composition as claimed in claim 1 and having a thickness of from 2 to 8 millimetres.

* * * * *